Nov. 1, 1966        S. BECKERMAN        3,282,546
CAKE PLATE AND SUPPORT THEREFOR
Filed Oct. 22, 1965        2 Sheets-Sheet 1
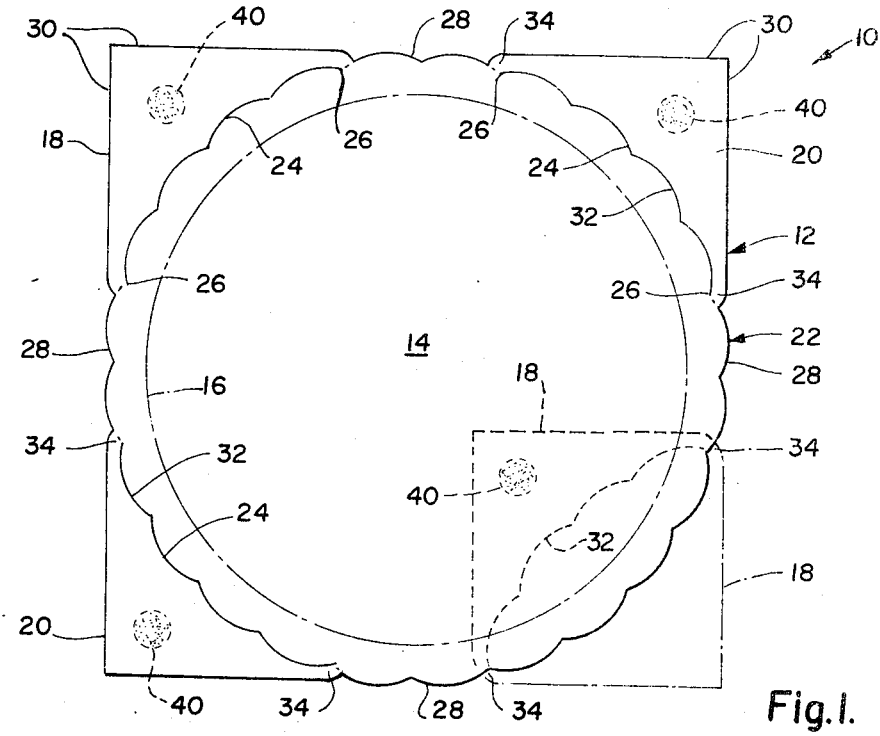
INVENTOR.
STUART BECKERMAN
BY
ATTORNEY Nov. 1, 1966     S. BECKERMAN     3,282,546
CAKE PLATE AND SUPPORT THEREFOR
Filed Oct. 22, 1965     2 Sheets-Sheet 2

INVENTOR.
STUART BECKERMAN
BY
ATTORNEY 3,282,546
CAKE PLATE AND SUPPORT THEREFOR
Stuart Beckerman, Pittsburgh, Pa., assignor to Package Products, Inc., Pittsburgh, Pa., a corporation of Pennsylvania
Filed Oct. 22, 1965, Ser. No. 500,950
8 Claims. (Cl. 248—174)

This invention relates to cake plates of the type formed from corrugated paperboard, and more particularly to improvements in cake plates of the type described provided with means formed integrally therewith for maintaining the cake plate spaced above a supporting surface.

As is known, conventional cake plates are usually formed from a piece of corrugated paperboard comprising upper and lower layers of relatively stiff paper and a layer of corrugated paper interposed therebetween. The upper layer of paper normally is wax or plastic coated to prevent the cake from sticking thereto and to prevent the cake moisture and grease from penetrating the cake plate, thereby rendering it useless. These conventional cake plates are formed from flat pieces of the corrugated paperboard. Hence, when the cake plate is placed on a flat surface, it is very difficult to lift it since there is no convenient portion thereof which may be easily grasped. This situation is further aggravated when the flat cake plate is placed in a conventional cake box. Furthermore, these flat cake plates cannot be conveniently retained on a platform of a display pedestal, particularly when the platform is sloped.

A further disadvantage of these conventional cake plates resides in the fact that the plate along with the cake supported thereon is permitted to shift in the cake box oftentimes resulting in damage to the cake decorations.

Accordingly, as an overall object, the present invention seeks to provide an improved cake plate.

Another object of the invention is to provide an improved cake plate which is easily grasped when it is desired to lift the plate from a flat surface or from within a cake box.

Still another object of the invention is to provide an improved cake plate which when placed in a cake box is maintained centered therein and will not shift about, thereby eliminating the damage to cake decorations normally occurring when a cake shifts within the cake box.

A further object of the invention is to provide an improved cake plate and support therefor wherein the cake plate is detachably interlocked with the support to prevent accidental movement thereof relative to the support.

In accordance with the present invention, a cake plate is provided which is formed from a flat piece of corrugated paperboard having a central portion adapted to support a cake and a plurality of segments connected to the periphery of the central portion. The segments are bendable downwardly out of the plane of the central portion and then inwardly toward the center of the central portion. Means is provided for connecting the segments to the lower face of the central portion. The segments thus serve to maintain the central portion spaced from a supporting surface whereby the edge thereof are easily grasped to lift the plate from the supporting surface.

In accordance with one embodiment of the invention, the segments which underlie the central portion comprise corner portions of the piece of corrugated paperboard. The edges of the segments and the undersurface of the central portion define channels extending along lines which intersect approximately at the center of the central portion. A pedestal is provided having a platform including ribs positioned to enter the channels. The cake plate is therefore interlocked with the pedestal and accidental shifting of the cake plate relative to the pedestal is prevented.

In accordance with another embodiment of the invention, two opposite corner segments are bent downwardly into engagement with the lower face of the central portion. The remaining two corner segments are not bent and are employed to maintain the cake plate, as well as the cake supported thereon, centered within a cake box.

In accordance with an alternative embodiment of the invention, the segments comprise tabs which are bendable into first sections providing legs for supporting the cake plate spaced above a supporting surface and second sections which are connected to the central portion and maintain the legs in their supporting relation relative to the central portion.

The above and other objects and advantages of the present invention will become apparent from the following detailed description by reference to the accompanying drawings, in which:

FIGURE 1 is a plan view of the upper face of a cake plate of the invention, illustrating bendable segments thereof;

FIG. 2 is a side view of the cake plate of FIG. 1 with one bendable segment thereof bent downwardly;

FIG. 3 is a side view of the cake plate of the invention in a condition ready to receive a cake;

FIG. 4 is a plan view of the lower face of the cake plate illustrating the relative positions of the bendable segments;

FIG. 5 is an isometric view of a pedestal adapted to support the cake plate illustrated in FIGS. 1–4;

Figure 7:
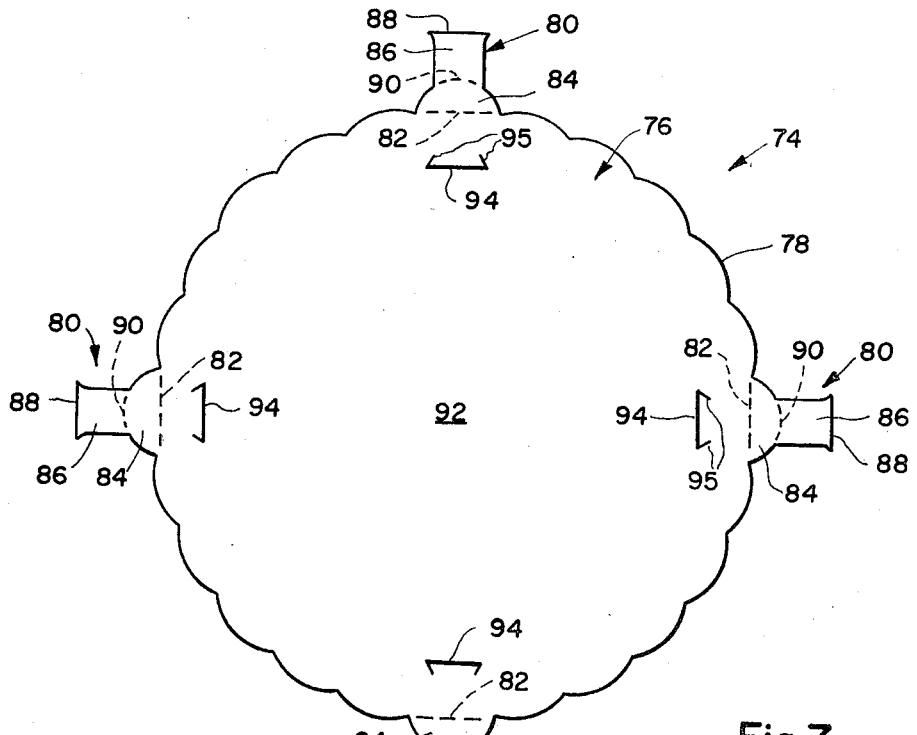
FIG. 7 is a plan view of an alternative embodiment of a cake plate of the invention, having plural bendable segments and illustrating its lower face.

Referring now to FIGS. 1–4, there is illustrated a cake plate 10 formed from a generally rectangular, flat piece of corrugated paperboard 12, in this instance, the cake plate 10 is square and includes a central portion 14 adapted to support a cake indicated by the dash-dot line 16, and pairs of opposite corner segments 18, 20. The cake plate 10, as shown in FIG. 1, may be stacked one above the other for shipment.

The central portion 14 has a generally circular peripheral edge 22 formed, in part, by cuts 24 of a generally circular and, in this case, convoluted configuration, which extend completely through the piece of corrugated paperboard 12 and terminating at ends 26 which are inwardly spaced from the outer edge of the piece of corrugated paperboard 12. Central edge portions of the corrugated paperboard 12 are cut away to form convoluted edges 28 which cooperate with the cuts 24 to complete the peripheral edge 22 of the central portion 14. It is to be noted that the corner segments 18, 20 are retained, thereby making substantially full use of the original piece of paperboard 12. In the prior art, the corner segments are cut off.

The corner sections 18, 20 are triangular in shape having mutually perpendicular straight edges 30 and arcuate bases 32 formed when the cuts 24 are made. The corner sections 18, 20 are integral with the central portion 14 at spaced plate portions 34. In accordance with the invention, the corner segments 18, 20 are bent downwardly out of the plane, indicated by a dash-dot line 36 in FIG. 2, of the central portion 14, inwardly toward the central portion 14 and finally into surface engagement with the lower face 38 of the central portion 14, as shown in FIGS. 3 and 4. A dab 40 of an adhesive, such as, a pressure-sensitive adhesive, is provided on the lower face of the corner segments 18, 20 for securing the segments 18, 20 to the lower face 38. Alternatively, a self-adhering adhesive may be applied to both the lower face of corner segments 18 and 20 and to the lower face of the central portion 14.

It is to be noted in FIG. 1 that the plate portions 34 at which the corner segment 18 is connected to the central portion, each form a segment of an edge convolution. Therefore, when the corner segment 18, for example, is bent under, its connection to the central portion is hidden. This fact is clearly illustrated in FIG. 1. Although the periphery of the central portion 14 may be in the form of a circle, the convoluted or scalloped configuration is preferred.

As a result of this construction, the exposed face of the central portion 14, as shown in FIG. 3, is spaced above a support surface, indicated schematically at 42, by an amount equal to twice the thickness of the corrugated paperboard 12. Furthermore, the bases 32 of the corner segments 18, 20 will be spaced inwardly of the peripheral edge 22, as illustrated by the lower corner segment 18 in FIG. 1. Consequently, a major portion of the peripheral edge 22 of the central portion 14 is free to be grasped, for example, by fingers 44 shown in dotted outline in FIG. 3, and lifted from the surface 42.

All of the corner segments 18, 20 may be bent under and secured to the central portion 14 as illustrated in FIG. 4, to provide a stable, easily lifted cake plate. However, as is ordinarily the case, a cake is transported to the home in a cake box during which the cake is subject to shifting within the box resulting in damage to the cake decorations. The present cake plate 10 is particularly useful in preventing shifting of the cake within the box, therefore preventing damage to the cake decorations.

Figure 6:
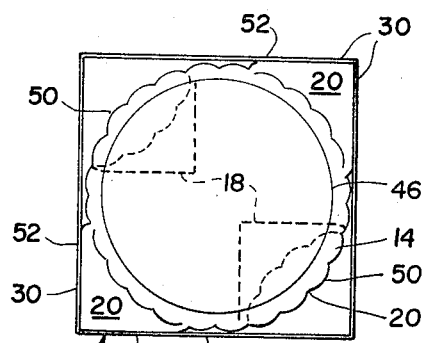
FIG. 6 is a plan view of the cake plate of FIG. 1 placed in a conventional cake box.

As can be seen in FIG. 6, the cake plate 10 is supporting a relatively large diameter cake 46 and has been placed in a conventional cake box 48. The corner segments 18 are bent under and secured to the central portion 14, in the manner described above. Consequently, the edge portions 50 of the peripheral edge 22 are spaced above the bottom of the cake box and may be easily grasped as explained above. In this instance, however, the corner segments 20 are not bent under and have their straight edges 30 engaged with the sides 52 of the cake box 48. It should be evident, then, that the cake plate 10 and hence the cake 46 are prevented from shifting in the box 48. That is to say, the unbent corner segments 20 engage the sides 52 of the cake box and prevent the cake plate from shifting within the box 48.

Referring now to FIG. 5, a pedestal 54 is illustrated, comprising a base 56 having an upright standard 58 supporting a circular platform 60. The platform 60 has ribs 62 projecting from its upper surface 64 and extending along imaginary lines 66 which intersect at approximately the geometric center of the platform 60. The circular platform 60 is detachably secured to the upright standard 58, for example, by means of a pin 68 formed integrally with the platform 60 and inserted within a bore provided in the upright standard 58. The platform 60 may, therefore, be removed and replaced by platforms of a larger or smaller diameter. Furthermore, the platform 60 may be swiveled as an aid in icing and decorating cakes. The platform 60 as well as the base 56 and upright standard 58 are most conveniently fabricated from plastic materials, although other materials of construction may be used.

In FIGS. 4 and 6, it can be seen that the edges 30 of the adjacent corner segments 18, 20 cooperate with the exposed portion of the lower face 38 to define channels 70 extending along imaginary lines 72 which intersect at approximately the geometric center of the cake plate 10.

Referring now to FIGS. 4 and 5, the ribs 62 are fabricated so that their width and thickness are substantially equal to the width and depth of the channels 70 in the cake plate 10. Consequently, as shown in dash-dot lines in FIG. 4, the ribs 62 will fit into the channels 70 to detachably connect the cake plate 10 to the platform 60. The interlocked relation of the ribs 62 and the channels 70 prevents movement of the cake plate 10 relative to the platform 60. Therefore, for display purposes and for icing and decorating, the platform 60 may be inclined and yet retain the cake plate 10 and cake placed thereon.

Figure 8:
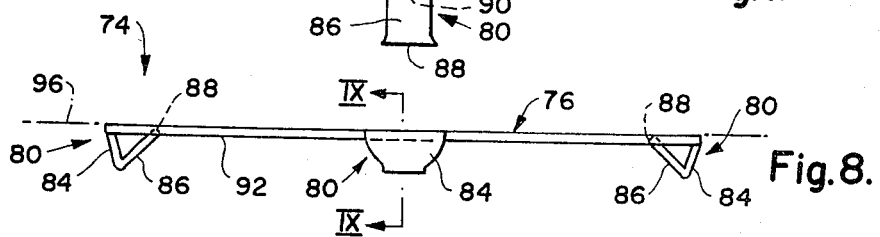
FIG. 8 is a side view of the cake plate of FIG. 7 in assembled form ready to receive a cake.
Figure 9:
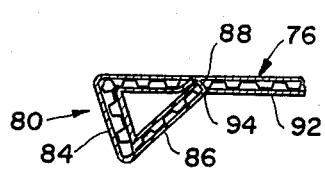
FIG. 9 is a cross-sectional view, on an enlarged scale, taken along the lines IX—IX of FIG. 7.

An alternative embodiment of the cake plate of the invention is illustrated in FIGS. 7-9, inclusive. In this embodiment, a cake plate 74 is provided comprising a generally circular central portion 76 having a peripheral edge 78 of a circular, or in this case, convoluted configuration, and a plurality of tabs 80 formed integrally with the central portion 76 and bendable along first bend lines 82 shown in FIG. 7. It is to be noted that the paperboard portions corresponding to the tabs 80 would, ordinarily, comprise waste material.

Each of the tabs 80 comprises an intermediate or leg portion 84 and an end portion 86 terminating in an edge 88 which is wider than the remainder of the end portion 86. The end portions 86 are bendable about a second bend line 90 shown in FIG. 7.

FIG. 7 is a view of the bottom face 92 of the cake plate 74. A plurality of slots 94 are provided in the bottom face 92, one inwardly spaced from each of the first bend lines 82. The slots 94 may have inwardly bent ends 95 to facilitate connection of the edges 88 in the slots 94.

To form the cake plate 74 in the configuration illustrated in FIGS. 8 and 9, the end portions 86 are bent downwardly along the second bend lines 90. The intermediate portions 84 are then bent downwardly out of a plane, indicated by the dash-dot line 96 of FIG. 8, of the central portion 76. Thereafter, the edges 88 are angled and then inserted into the slots 94 to be frictionally retained therein. As can be seen in FIG. 8, the intermediate portions 84 serve as legs by which the central portion 76 is elevated above a support surface, such as, a table top. Therefore, the peripheral edge 78 of the cake plate 74 is completely free to be grasped for the purpose of lifting the cake plate 74 from a table top or for lifting the same out of a conventional cake box.

In FIG. 7, the cake plate 74 is illustrated in a flat unbent configuration. It should be evident that when in this flat condition, a plurality of the cake plates 74 may be stacked one above the other and bundled for shipment.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A cake plate formed from a piece of flat corrugated paperboard having a central portion adapted to support a cake and a plurality of segments connected to the periphery of said central portion, said segments being bendable out of the plane of said central portion and inwardly toward the center of said central portion, and means for connecting said segments to said central portion, said segments maintaining said central portion spaced from a supporting surface whereby edge portions of said central portion are free to be grasped to lift the plate from said supporting surface.

2. The cake plate as defined in claim 1 wherein each of said segments comprises a corner section of said corrugated paperboard connected at spaced points to the periphery of said central portion, said segments being secured in surface engagement with the lower face of said central portion.

3. The cake plate as defined in claim 2 wherein said connecting means comprises an adhesive.

4. The cake plate as defined in claim 2 wherein two opposite corner segments remain coplanar with said central portion and are positioned to engage opposite corners of a cake box to prevent shifting of the cake plate and hence a cake supported thereon, relative to the cake box.

5. The cake plate as defined in claim 1 wherein each of said segments comprises intermediate portions depending downwardly from said central portion and end portions extending inwardly into engagement with said central portions, said intermediate portions comprising legs which maintain said central portion elevated above a supporting surface.

6. The cake plate as defined in claim 5 wherein said connecting means comprises slits formed in the underside of said central portion into which the extreme ends of said end portions are frictionally retained.

7. A cake supporting assembly comprising a pedestal and a cake plate, said pedstal comprising a base, a platform at the upper end of said base, and ribs projecting upwardly from the upper surface of said platform and extending along lines which intersect at substantially the center of the platform, said cake plate resting on said platform, said cake plate being formed from a piece of flat corrugated paperboard having a central portion adapted to support a cake and a plurality of segments connected to the periphery of said central portion, said segments being bent downwardly out of the plane of said central portion into engagement with the lower face of said central portion, the edges of adjacent pairs of segments cooperating with the lower face of said central portion to form channels in which said ribs reside, whereby said cake plate is interlocked with said pedestal and is prevented from moving across said platform.

8. The cake plate supporting assembly of claim 7 wherein the depth and width of said channels are substantially equal to the thickness and width of said ribs.

References Cited by the Examiner
UNITED STATES PATENTS

| | | | |
|---|---|---|---|
| 1,717,456 | 6/1929 | Lasher | 248—174 |
| 2,829,459 | 4/1958 | Halpern | 161—42 |

CLAUDE A. LE ROY, *Primary Examiner.*